US006733855B1

(12) United States Patent
Scott

(10) Patent No.: US 6,733,855 B1
(45) Date of Patent: May 11, 2004

(54) LABEL

(76) Inventor: Leonard James Scott, 78 Grant Road, Somerville, Victoria 3912 (AU)

( * ) Notice: Subject to any disclaimer, the term of this patent is extended or adjusted under 35 U.S.C. 154(b) by 0 days.

(21) Appl. No.: 09/720,691

(22) PCT Filed: Aug. 24, 1999

(86) PCT No.: PCT/AU99/00681

§ 371 (c)(1), (2), (4) Date: Dec. 28, 2000

(87) PCT Pub. No.: WO00/19395

PCT Pub. Date: Apr. 6, 2000

(30) Foreign Application Priority Data

Sep. 24, 1998 (AU) .............................................. PP6135
Aug. 2, 1999 (AU) ............................................ 42420/99

(51) Int. Cl.$^{7}$ .................................................. B32B 7/12

(52) U.S. Cl. .................... 428/40.1; 428/41.3; 428/41.8; 428/42.1; 428/354; 283/81

(58) Field of Search .............................. 428/40.1, 41.3, 428/41.8, 42.2, 42.1, 354; 283/81

(56) References Cited

U.S. PATENT DOCUMENTS 4,398,985 A 8/1983 Eagon ........................ 156/233
5,040,296 A * 8/1991 Yerger ........................... 30/81
5,135,261 A * 8/1992 Cusack et al. ................ 283/81
5,262,214 A * 11/1993 Instance ...................... 428/40
5,975,575 A * 11/1999 Instance ........................ 281/2

FOREIGN PATENT DOCUMENTS

CA 2172237 3/1996
WO 9841966 9/1998

OTHER PUBLICATIONS

Derwent Abstract Accession No. 98–588748/50, JP 10–264338.
Derwent Abstract Accenssion No. 98–255608, JP 10–081860.

* cited by examiner

*Primary Examiner*—Daniel Zirker
(74) *Attorney, Agent, or Firm*—Baker Botts LLP

(57) ABSTRACT

A composite label (1) including a first layer (5) of printed polyester for displaying information at a first major surface (2) of the label and a second layer (7) including material having a density less than the polyester for presenting information at a second major surface (3) of the label, the second layer including a removable portion (8) arranged to be separated from the label and secured to another object. Preferably, the material of the second layer comprises polypropylene and includes an adhesive (40) on one side thereof for securing the removable portion to the first layer and the first layer includes a release coating (38) to facilitate removal of the portion therefrom, the adhesive and release coating providing a release strength factor of between 17 grams force/50 mm and 30 grams force/50 mm. In an alternative arrangement, the label (1) may be provided with a clear polyester forming the first layer and the second layer may include a clear polypropylene with a plurality of overlaid print layers applied thereto for displaying information to both sides for the label.

16 Claims, 4 Drawing Sheets

LABEL

FIELD OF THE INVENTION

The present invention relates to the field of labels, particularly labels with removable promotional or advertising material.

BACKGROUND OF THE INVENTION

The broad concept of providing labels with removable adhesive stickers is known. For example, International Patent Application No. PCT/US97/18837 discloses a label with an adhesive sticker arranged on an inside face of the label. Such a label is, however, known to be formed of a simple double layer construction of conventional laminated paper or polypropylene material which is considered to be cost effective and sufficiently robust for use with tinned produce or the like. There has not to the applicant's knowledge been any suitable application of such a label to the soft drink industry where material thickness and reliable application of the label is of paramount concern.

The object of the present invention is to provide a label construction which is particularly, but not exclusively, suitable for use in a commercial bottle labelling installation and more specifically it is an object to provide a label which is readily adapted to be cut and wrapped about a bottle for proper application during bottle manipulation.

SUMMARY OF THE INVENTION

In accordance with the invention, there is provided a composite label including a first layer of printed polyester for displaying information at a first major surface of the label and a second layer including material having a density less than the polyester for presenting information at a second major surface of the label, the second layer including a removable portion arranged to be separated from the label and secured to another object.

Polyester has previously been used as a clear laminate for labels but has not, to the Applicant's knowledge, ever been used as an information carrying surface in a composite label. The invention preferably uses a white polyester which is chemically treated for penetration and acceptance of ink. Preferably, the material of the second layer comprises polypropylene. The polyester provides a number of advantages due to its comparative density relative to the polypropylene. For example the depth dimension of the label may be minimised whilst a suitable degree of strength is maintained in the label and the polypropylene may be readily cut or scored due to its relative softness, so as to define the removable portion, without compromising the integrity of the polyester layer.

Preferably, the second layer includes an adhesive on one side thereof for securing the removable portion to the first layer and the first layer includes a release coating to facilitate removal of the portion therefrom, the adhesive and release coating providing a release strength factor of between 17 grams force/50 mm and 30 grams force/50 mm.

Such a release strength factor represents the result of a considerable amount of research into application of a composite label to the bottling industry. The release strength factor prevents accidental "fly-offs" or separation of the first and second layers during high speed labelling, whilst still allowing a user to peel off the removable portion with relative ease.

Accordingly, another broad aspect of the invention relates to the release strength factor and provides a composite label including a first layer for displaying information at a first major surface of the label and a second layer including a removable portion arranged to be separated from the label and secured to another object, wherein the second layer includes an adhesive on one side thereof for securing the removable portion to the first layer and the first layer includes a release coating to facilitate removal of the portion therefrom, the adhesive and release coating providing a release strength factor of between 17 grams force/50 mm and 30 grams force/50 mm.

The first and second layers may then be formed as described above but, alternatively, the second layer may instead be printed with information for display to both sides thereof and the first layer may be transparent such that the information printed on the second layer is viewable from the first major surface of the label.

In that regard, the second layer may also be a transparent material, such as clear polypropylene, with a plurality of overlaid print layers applied thereto comprising a first image printed on the transparent material, for display toward the first major surface, a masking layer and a second image facing outwardly of the second major surface.

Preferably, the release coating is formed of a silicon material.

Preferably, a clear polypropylene laminate is applied on the first major surface. Preferably a varnish is applied to the second major surface with a coefficient of friction in the range of about 0.25 to 0.40.

Preferably, a depth dimension of the first layer is in the range of about 12 micron to 36 micron Preferably, the second layer has a depth dimension in the range of about 23 micron to 36 micron.

Preferably, the second layer includes a mark for detection by an electronic eye to facilitate actuation of a cutting device, for scoring the second layer so as to define the removable portion. Preferably the portion is in the form of a sticker.

Preferably, the label is for use with a bottle and includes an aggressive adhesive applied to the second major surface in a region adjacent the removable portion, to facilitate secure attachment of the label to the bottle.

BRIEF DESCRIPTION OF THE DRAWINGS

The invention is more fully described, by way of non-limiting example only, with reference to the accompanying drawings, in which.

DETAILED DESCRIPTION OF PREFERRED EMBODIMENTS

Figure 2:
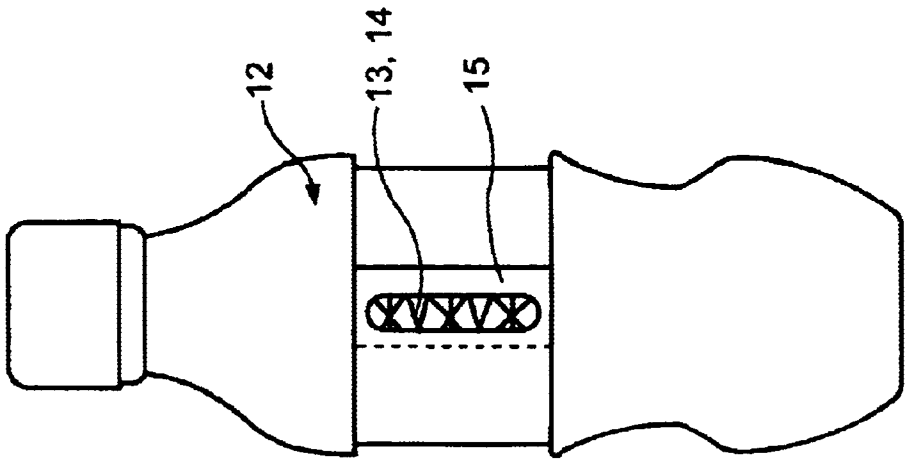
FIG. 2 is a perspective view of a bottle with the label affixed thereto.
Figure 1:
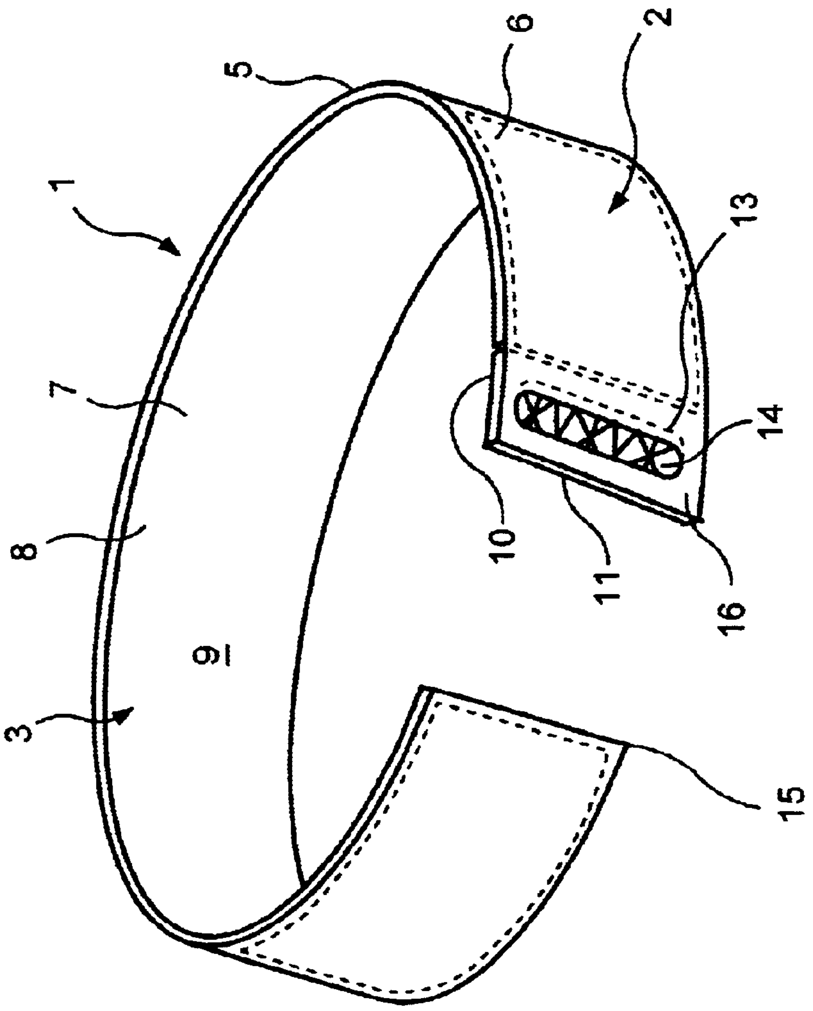
FIG. 1 is a perspective view of a label in accordance with the invention.

The label 1 includes a first major surface 2 which is arranged to present information such as, for example, a trade mark or advertising material, and a second major surface 3. The first major surface is formed by a first layer 5 of printed polyester, which is preferably coated with a clear polypropylene laminate 6 and the second major surface 3 is formed by a second layer 7 of polypropylene. The second layer 7 is divided into a removable portion 8, such as a sticker 9, and a tab 10 which comprises part of fastening means 11 for securing the label to an object such as a bottle 12, as shown in FIG. 2.

The label 1 is affixed to the bottle 12 by securing the fastening means 11 to the bottle with a suitable first aggressive adhesive 13. A second aggressive adhesive 14 may then be applied such that a second end 15 of the label may be wrapped around the bottle 12 and securely attached to a first end 16 of the label 1.

Figure 3:
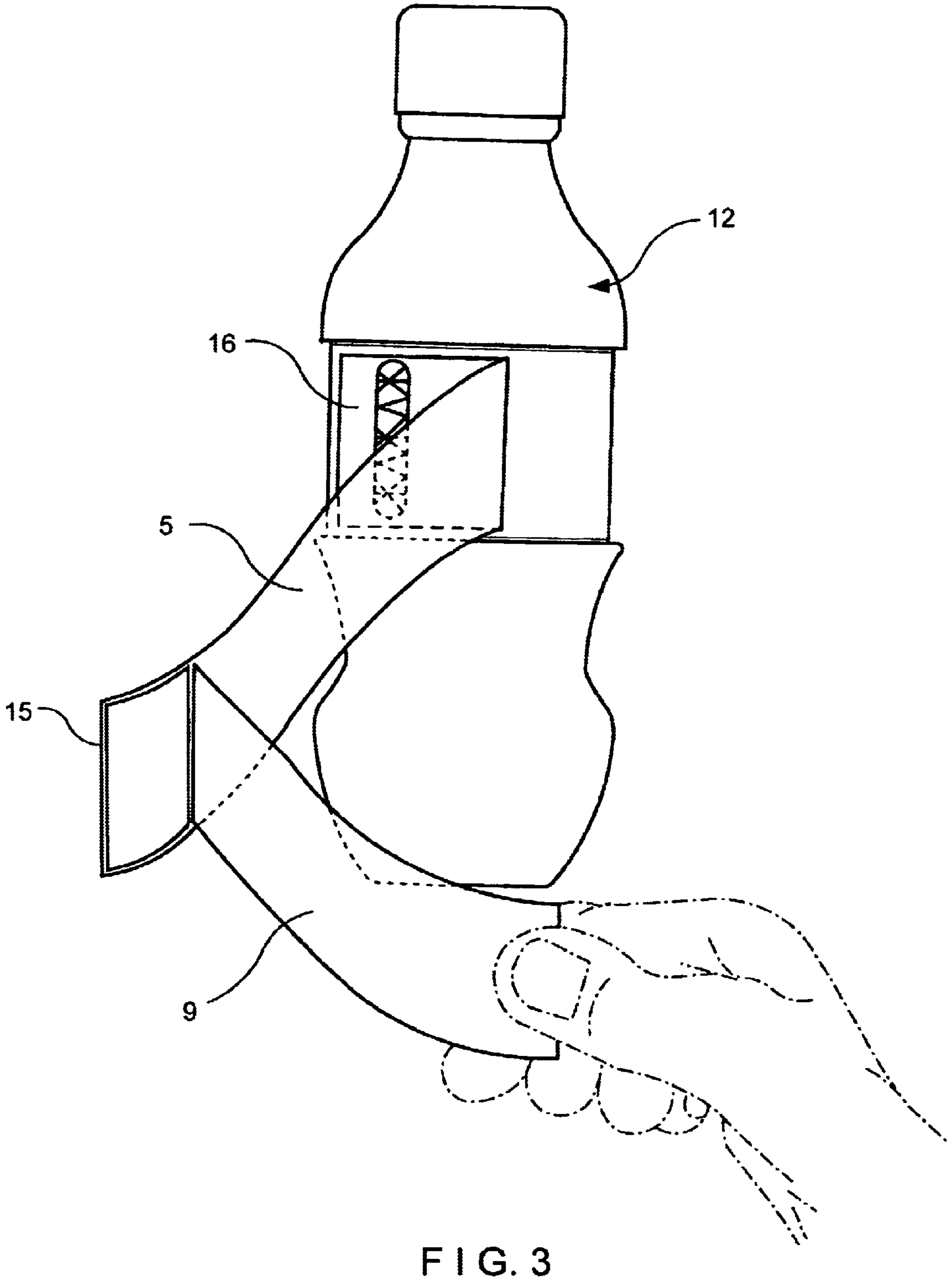
FIG. 3 is a perspective view of the bottle of FIG. 2 with the label partially removed.

The second end 15 of the label 1 may then be freed by gripping the second end and peeling it away from the first end 16. The label may then be unwound from the bottle and the sticker 9 removed in the manner shown in FIG. 3. The fastening means ensures that the label 1 remains attached to the bottle 12.

As can be appreciated from the above, the invention provides a means of utilising a second major surface of a label by attaching a removable sticker thereto. Further, removal of the sticker may be achieved without removing the rest of the label from the bottle so as to inhibit littering which may otherwise result if the label disengages from the bottle.

The construction of the label is more fully described with reference to FIG. 4.

The first layer 5 is produced by firstly forming a suitable polyester at step 20. The polyester is preferably a white polyester produced by combining PET (polyethylene terepthalate) material with titaniumdioxide. The material is then chemically treated at step 21 for acceptance and penetration of ink, using a suitable combination of methylmethacrylate, butylacrylate, melamine resin and acrylic binder. Conventional plasma/Corona treatment was found not to provide adequate ink acceptance, with the result of deterioration and ink delamination from the polyester.

A release coating is applied at 22 on a side of the first layer which is to face the removable portion of the second layer. The release coating is preferably applied by way of a solvent based silicone treatment or a UV based coated silicone treatment in order to render the first layer with a silicone coating in the order of 0.5 to 3.0 grams/m$^2$, to provide a tight release of between 17 grams force/50 mm and 30 grams force/50 mm. Such a release strength factor achieves a significant advantage in that inadvertent release of the second layer from the first layer during labeling is prevented whilst still allowing the sticker portion 8 to be relatively easily removed by a purchaser of the bottle.

The second layer 7 is produced simultaneously with the first layer 5 and is formed of a material of less density than the first layer. The material is preferably polypropylene material which is formed at step 23, preferably as a white or opaque Biaxially Orientated Polypropylene (BOPP) which is then subjecting to a conventional Corona treatment 24 in order to lift a Dyne level of the material to within the range 33 to 73 for enhanced print adhesion.

A side of the second layer facing toward the first layer is coated with an adhesive at step 25.

The adhesive is preferably an acrylic emulsion adhesive or a solvent based adhesive, suitable for effective operating temperatures of between −16° C. and 78° C. The adhesive is applied either by way of a roller or suitable spray system, to achieve a range of 9 to 25 grams/m$^2$.

The first and second layers are each produced separately in a continuous strip form and are secured together at step 26, whereby the adhesive applied to the second layer at step 25 is removably attached to the release coating of the first layer, applied at step 22. The "burst strength" of the combined layers was found to be in the order of 20 to 28 kg/mm$^2$.

At step 27, a printing process is applied to form printed information, artwork or the like for display at the first major surface, facing outwardly of the bottle to which the label is attached to.

Simultaneously, a printing process 28 is applied to provide the artwork to the sticker 9 whilst also rendering an eye mark on the second layer, followed by application of a slip varnish which is applied over the artwork at step 29. A clear polypropylene protective laminate may then be applied at step 30 on the outward facing side of the first layer.

The combined layers are then passed under an electronic eye at step 31 which detects the eye mark and actuates a rotary cutter at 32 to score a line in the second layer which defines the removable portion of the label. A second electronic eye 33 activates another rotary cutter at 34 to separate the strip of combined layers into individual labels which are then passed about a vacuum roller (not shown) for application of aggressive adhesive and attachment to a respective bottle.

Figure 5A:
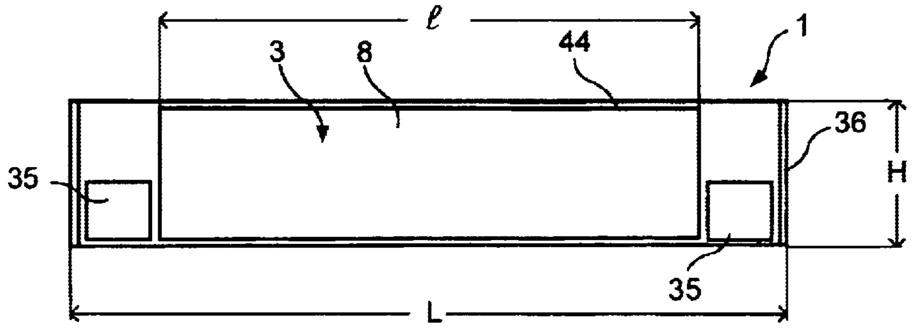
FIG. 5*a* is a diagrammatic plan view of the label of the invention.

A more detailed example of the appearance of the second major surface 3 of a label 1, constructed in the above manner is shown in FIG. 5*a*. The label may be of any suitable dimensions. As an example, the label may be adapted to fit to a conventional 600 ml bottle produced by, for example, Coca-Cola and has an overall length dimension "L" of 235 mm and a height dimension "H" in the order of 45 mm. The removable sticker portion 8 may have a length "l" in the order of 175 mm in order to provide 30 mm long scanning regions 35 at either end of the label, to allow for reliable detection of an eye mark 36, which facilitates actuation of the rotary cutters at steps 32 and 34.

Figure 5B:
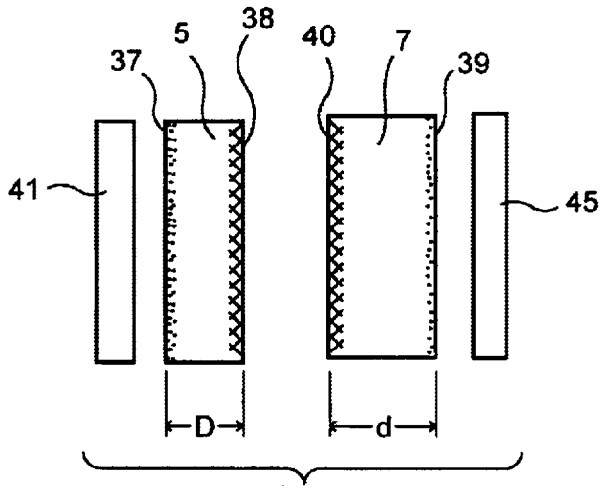
FIG. 5*b* is a diagrammatic exploded cross-section view of the label of FIG. 5*a*.

Referring now to the diagrammatic exploded cross section of FIG. 5*b*, the depth dimension "D" of the first layer 5, including print 37 and release coating 38 is in the range of about 12 micron to 36 micron. The second layer 7, including print 39 and adhesive 40, has a depth dimension "d" in the range of about 23 micron to 40 micron. This compares favourably with a conventional bottle label which has an overall depth dimension in the range 40 to 46 microns, allowing for addition of the clear polypropylene overlaminate 41, in the order of 12 micron.

Figure 6:
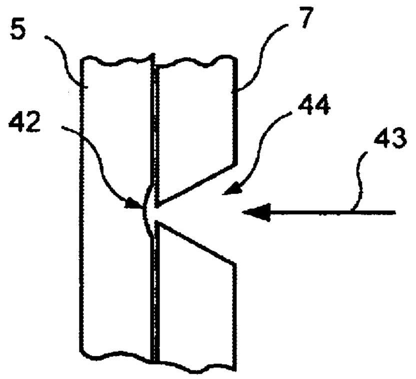
FIG. 6 is a diagrammatic cross-sectional view of a score line being formed in the label.

As may be appreciated, the relative density and strength of the polyester created allows the overall thickness of the label 1 to be minimised so as to be comparable to that of a conventional label. The relative density of the polyester also provides an advantage that the polypropylene of the second layer 7 may be,readily scored without cutting through the first layer. This is illustrated diagrammatically in FIG. 6 where a region 42 of the polyester layer 5 resists a force generated by a cutting action, indicated by arrow 43, which serves to cut through the relatively soft polypropylene to produce a score 44 in the second layer 7. Such a score is represented by line 44 in FIG. 5*a*, for defining the removable portion 8. As such, the second layer may be readily scored by the rotary cutter at step 32, as represented in FIG. 4, without severing or perforating the label as a whole. Accordingly, the label may still reliably be fed through a conventional bottling installation.

In addition to the above label composition, it may also be necessary to apply the slip varnish 45 to reduce the co-efficient of friction (C.O.F.) of the label to that available with conventional labels, in order that the label 1 runs smoothly through a labelling installation. More specifically, at present, bottle labels may be impregnated with "dust" on a rear surface, at a mill stage so that whilst travelling along the path of a labeller, at certain points, the material slips into predetermined positions, such as during application to a bottle. In particular, after individual labels are cut using electronic eye technology the individual labels are applied to a vacuum drum and allowed to "slip" around the vacuum drum until a bottle travels past.

The degree of slip is critical to allow correct timing for application of the labels and is determined by the C.O.F. of the label.

The label of the present invention does not have the "dust" impregnated in the second major surface, as this would interfere with application of the print 39. Accordingly, the label needs an additional slip varnish 45 to provide C.O.F. characteristics similar to a convention label.

A suitable varnish was formed utilizing the following components:

LABELSTAR™ 2540 varnish 11132144 is a slip varnish (C.O.F.) Modified STARPAC™ AS3 varnish 11006151. This was achieved by an addition of 1.2% of polyolefin wax to STARPAC™ AS3 varnish 11006151.

synthetic silicone altemate. 0.1% glassene silicone alternate 0.99% plasticiser agent 0.5% polyester waxing agent 1.23%±0.3% emulsifier 2.0%+0.6%

The overall C.O.F. of the slip varnish may be varied by modifying the combinations of both natural waxes and synthetic silicones so that a minimum range of 0.25 C.O.F. and a maximum range of 0.40 may both be achieved, as required.

Figure 7:
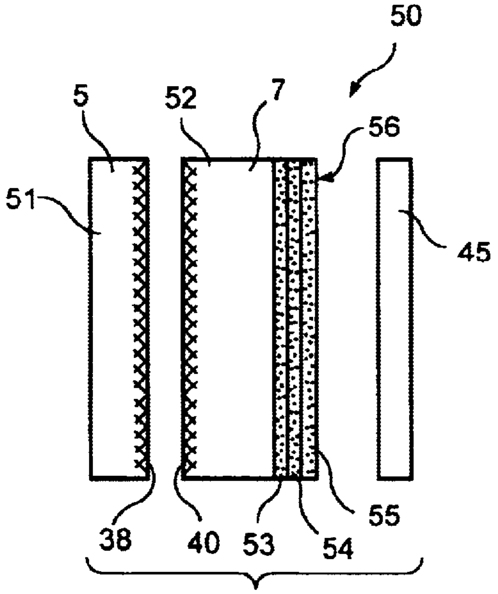
FIG. 7 is a diagrammatic cross-section view, similar to that shown in FIG. 5*b*, illustrating an alternative label construction.

FIG. 7 illustrates an alternative label construction. The label 50 is formed in a generally similar manner to the label 1 and like parts are denoted with like reference numerals. In particular, the label 50 includes first and second layers 5,7 with a respective release coating 38 and adhesive 40, and slip varnish 45. The layers 5,7 are, however, formed of transparent material 51,52 preferably clear polyester and polypropylene, respectively. Instead of having a single layer of print 39, formed on the second layer 7, a plurality of overlaid print layers 53, 54 and 55 are instead formed on one side 56 of the second layer 7. The print layers comprise a first layer 53 printed directly onto the material 52 as a 'reverse' image for display toward the first major surface of the label, a masking layer 54 and a final layer 55 forming a second image facing outwardly of the second major surface of the label. Each of the print layers 53,55 may of course in turn comprise a number of different ink layers required to form each of the images.

Figure 4:
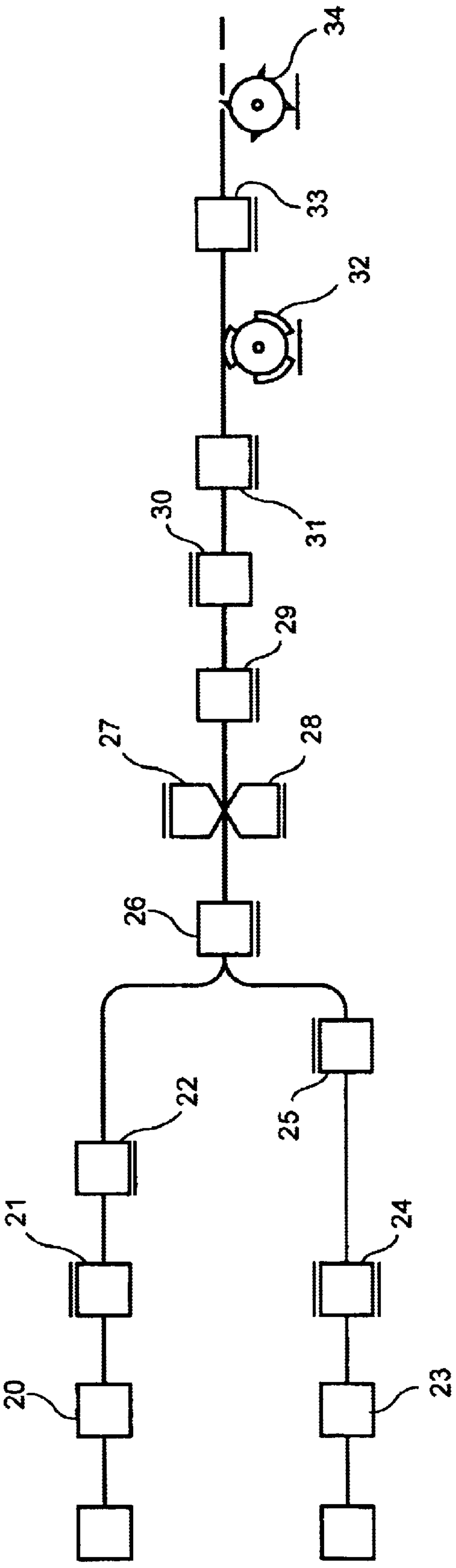
FIG. 4 is a schematic flow chart illustrating the manufacturing steps for producing the label.

Such an arrangement of print layers simplifies the production process of FIG. 4 to some extent since all of the printing procedures may be effected from one side only of the label and the need for a protective overlaminate 41, applied at step 30, may be dispensed with.

It is, however, a further possibility that the print layers 53,54,55 may be used in combination with a printed or opaque polyester layer 5 such that the image of print layer 53 may be obscured prior to removal of the portion 8. For that purpose, the polyester layer may perhaps be metallized. Such an arrangement may have application to a competition or a game where an image associated with a prize or the like needs to initially be hidden. Otherwise, the release strength factor between the first layer and removable portion 8, the relative density of the layers, to allow for appropriate scoring, and the coefficient of friction characteristics are the same as for the label 1.

The invention has been described by way of non-limiting example only, and many modifications or variations may be made thereto without departing from the spirit or the scope of the composite label as described.

What is claimed is:

1. A composite label including a first layer of printed polyester for displaying information at a first major surface of the label and a second layer for presenting information at a second major surface of the label, the second layer including a removable portion arranged to be separated from the label and secured to another object, and wherein the second layer is formed of a material having a density and softness less than the polyester, to allow the second layer to be cut or scored so as to define the removable portion, without compromising the integrity of the first layer.

2. A composite label as claimed in claim 1, wherein the material of the second layer comprises polypropylene.

3. A composite label including a first layer for displaying information at a first major surface of the label, and a second layer including a removable portion arranged so as to be separated from the label and secured to another object, wherein the second layer includes an adhesive on one side thereof for securing the removable portion to the first later and the first layer includes a release coating to facilitate removal of the portion therefrom, the adhesive and release coating providing a release strength factor of between 17 grams force/50 mm and 30 grams force/50 mm, and wherein the first layer is formed of polyester and the second layer includes material having a softness less than the polyester, to allow the second layer to be cut or scored so as to define the removable portion, without compromising the integrity of the first layer.

4. A composite label as claimed in claim 1 or 3, wherein a clear polypropylene laminate is applied on the first major surface.

5. A composite label as claimed in claim 1 or 3, wherein a varnish is applied to the second major surface to provide the second major surface with a coefficient of friction in the range of about 0.25 to 0.40.

6. A composite label as claimed in claim 1 or 3, wherein the polyester is white.

7. A composite label as claimed in claim 1 or 3, wherein the polyester is metallized.

8. A composite label as claimed in claim 1 or 3, wherein a depth dimension of the first layer is in the range of about 12 micron to 30 micron.

9. A composite label as claimed in claim 8, wherein the second layer has a depth dimension in the range of about 23 micron to 40 micron.

10. A composite label as claimed in claim 1 or 3, wherein the second layer includes a mark for detection by an electronic eye to facilitate actuation of a cutting device, for scoring the second layer so as to define the removable portion.

11. A composite label as claimed in claim 10, wherein the portion is in the form of a sticker.

12. A composite label as claimed in claim, 10, for use with a bottle, the label including an aggressive adhesive applied to the second major surface in a region adjacent the removable portion, to facilitate secure attachment of the label to the bottle.

13. A composite label as claimed in claim 3, wherein the second layer is printed with information for display to both sides thereof.

14. A composite label as claimed in claim 13, wherein the first layer is transparent such that the information printed on the second layer is viewable from the first major surface of the label.

15. A composite label as claimed in claim 13, wherein the second layer includes a transparent material with a plurality of overlaid print layers applied thereto comprising a first image printed on the transparent material, for display toward the first major surface, a masking layer and a second image facing outwardly of the second major surface.

16. A composite label as claimed in claim 15, wherein the transparent material of the second layer is clear polypropylene.

* * * * *

UNITED STATES PATENT AND TRADEMARK OFFICE

CERTIFICATE OF CORRECTION

PATENT NO. : 6,733,855 B1
DATED : May 11, 2004
INVENTOR(S) : Scott

It is certified that error appears in the above-identified patent and that said Letters Patent is hereby corrected as shown below:

Column 6,
Line 60, "claimed in claim, 10," should read -- claimed in claim 10, --

Signed and Sealed this

Twenty-first Day of December, 2004

JON W. DUDAS
*Director of the United States Patent and Trademark Office*